United States Patent Office

2,853,391
Patented Sept. 23, 1958

2,853,391

EMULSIFYING AND STABILIZING COMPOSITION FOR FROZEN CONFECTIONS AND METHOD OF IMPROVING FROZEN CONFECTIONS

Norman S. Harrison, Center Point, Tex., assignor to Norman Harrison Corporation, Comfort, Tex., a corporation of Texas No Drawing. Application January 3, 1955
Serial No. 479,668

2 Claims. (Cl. 99—136)

The present invention relates to emulsifying and stabilizing compositions for use in frozen confections to improve the quality of such confections.

Basically, the invention resides in the discovery that the combination of polyphosphates with emulsifiers and stabilizers for frozen confections in certain specified proportions unexpectedly improves the quality of these confections.

Emulsifiers are used in ice cream making because they bring about a finer dispersion of fat and reduce the tendency of fat particles to cohere. Thus, they reduce clumping in homogenization and churning in freezing. Hence, they promote better whipping qualities in the mix (improved overrun), produce more finely divided air cells and consequently a drier appearance in the frozen product. They make possible a lower drawing temperature at the freezer without sacrifice to overrun, and induce greater stiffness, better texture, and a slower melt down. They reduce the size of the ice crystals formed during freezing and storage.

The function of emulsifiers in some degree overlaps those of stabilizers such as gelatin and certain vegetable gums. The latter act by absorbing water and forming gels. Most stabilizers are emulsifiers in that they stabilize fat emulsions and tend to improve whipping ability and texture in ice cream making. But the property usually associated with stabilizers is their ability to induce the formation of and maintain ice crystals of small size (that is, of such size that their presence in ice cream will not be felt on the tongue) during freezing, handling and storage of ice cream. Emulsifiers share this property with stabilizers. (Arbuckle—"Ice Cream Trade Jr.," 46 No. 10, 106–1950.)

Some disadvantages of emulsifiers are that in batch and counter freezers certain types of emulsifiers accentuate the defects they are intended to remedy. For example, polyoxyethylene sorbitan mono-oleate appears to increase churning and decrease overrun in these types of freezers. Emulsifiers of the fatty acid mono-esters of glycerol type remedy to some extent these unfavorable effects, but when used in effective concentrations affect adversely the taste of the product.

The present invention associates another agent, not in itself an emulsifier, with fatty acid esters of glycol, glycerol, sorbitol, sorbitan, and other substituted polyhydric alcohols or mixtures thereof and by its action on milk protein and milk salts enhances the effects of these emulsifiers and remedies in some measure their defects.

When polyphosphates of alkali metals with sequestering powers for calcium are added to milk in suitable proportions, together with emulsifiers of the kinds specified and the mixture made into an ice cream mix in the usual way, it is found that the mix (a) Has improved whipping qualities;
(b) Gives better texture in the frozen product;
(c) Lessens churning in batch and counter freezers;
(d) Requires less emulsifier for a given effect;
(e) Promotes drier appearance in the ice cream;
(f) Increases stiffness so that a higher drawing temperature can be employed and
(g) Consequently makes possible a saving in refrigeration at the freezer (which may be useful when refrigeration is operating at full capacity during hot weather);
(h) Makes possible a saving in the use of stabilizers.

Examples of these alkali metal polyphosphates are sodium tripolyphosphate, tetrasodium pyrophosphate, and sodium hexametaphosphate.

A concentration of alkali metal polyphosphate of from 0.15% to 0.3% and of emulsifier of from 0.01% to 0.1% has been found most suitable for effectiveness. The two substances are added to the mix in the pasteurization vat at the beginning of the pasteurization period.

In the course of pasteurization and aging, it is probable that formation of sodium caseinate takes place. It is noticeable that at the end of the pasteurization period, the mix is less white in color and less opaque. This effect is more marked at the higher concentrations of polyphosphate and is especially marked with sodium hexametaphosphate. There is some fall in the pH of the mix during pasteurization and aging. Formation of sodium caseinate would be favored by the mix pH (6.5), the isoelectric point of casein being at pH 4.6. Substitution of a portion of the non-fat milk solids with sodium caseinate promotes the favorable effects observed with polyphosphates and emulsifiers.

The hydroxyl groups in the emulsifiers may increase casein re-activity. The precipitating effects of alcohols on proteins are well known, and although the emulsifiers in mixes are present in low proportions, they present a large surface around the minute oil particles. The curding of casein in the presence of 0.05% polyoxyethylene sorbitan mono-oleate after a very brief whipping is shown in an experiment below. If sodium caseinate absorbes more water than calcium caseinate (and the increased whipping volumes and stiffness in the whipping test could hardly be explained on any other basis), the stabilizing effects of the composition are understandable.

The following test can be made to demonstrate the favorable effects of polyphosphate and emulsifiers in ice cream mixes. A mix is made of the following composition: 12% fat, 11% non-fat milk solids, and 16% cane sugar, the balance water. The polyphosphate and emulsifier are added and the mix pasteurized at 165° F. for 30 minutes. It is then homogenized, cooled to 40° F. and aged for four hours at 40° F., after which it is cooled to 32° F. and whipped in a vessel surrounded by melting ice for two minutes. Its consistency is observed after one minute's whipping and after two minute's whipping. Thereafter its volume is measured.

Small quantities can be dealt with expeditiously in this way and several tests run concurrently. While the conditions during whipping do not reproduce those in a freezer, especially in regard to temperature, they approach them to some extent. A mix that whips quickly to a stiff consistency (makes peaks) and shows at the same time an increase in volume to a certain degree can be expected to show good whipping ability in the freezer and good texture in the frozen product as observations of ice cream plant operating results have shown.

If a portion of the whipped mix is quickly frozen in a thin layer in a suitable container, further observations can be made on body, texture, and melt down characteristics.

The following tables, obtained from test mixes as set forth above without any polyphosphates or emulsifiers, then with emulsifiers and then with both emulsifiers and polyphosphates bear out the advantages of the utilization of both emulsifiers and polyphosphates in improving the whipping qualities of frozen confections.

TABLE I

*The behavior of different fats in the whipping test*

| Kind of fat | 1 minute whipping | 2 minute whipping | Volume (ml.) |
|---|---|---|---|
| Armour Frostar (animal fat). | Thickened a little. | Piling up. | 256 |
| Humko's Mello Mix (vegetable fat). | ----do---- | Piling up fairly heavily. | 256 |
| Tucker's Velvet (vegetable fat). | ----do---- | Piling up. | 248 |
| Swift's Shasta (vegetable fat). | ----do---- | Piling up heavily. | 248 |

As far as is known, the fats set forth in Table I do not contain emulsifiers. Further, no significant differences appear between different brands of fats or between vegetable and animal fats.

Although all of the mixes thickened upon whipping and disclosed some piling up, no peaks were formed during the whipping, the formation of which constitutes a desirable indication of good overrun characteristics.

TABLE II

*The results in whipping test of using different amounts of emulsifier with the same fat*

| Fat (Swift's Shasta) additives in percent by weight of mix | 1 minute whipping | 2 minute whipping | Volume (ml.) |
|---|---|---|---|
| Glyceryl monostearate, 0.01. | Thickened fairly heavily. | Fairly firm peaks. | ¹ 273 |
| Glyceryl monostearate, 0.02. | Thickened heavily. | Firm peaks. | ² 299 |
| Glyceryl monostearate, 0.03. | ----do---- | Loose to firm peaks (not as firm as preceding). | ¹ 306 |
| Glyceryl monostearate, 0.04. | Thickened a little. | Loose peaks. | ¹ 306 |
| Glyceryl monostearate, 0.05. | ----do---- | Piling up fairly heavily. | ¹ 271 |
| Glyceryl monostearate, 0.07. | Thickened. | Piling fairly heavily. | ¹ 279 |
| Glyceryl monostearate, 0.08. | ----do---- | Piling heavily. | ¹ 279 |
| Glyceryl monostearate, 0.10. | ----do---- | Piling very heavily. | ¹ 279 |

¹ Poured easily.
² Poured rather slowly.

From the foregoing table, it can be seen that the whipping ability of the mix was increased up to a concentration of approximately .03% emulsifier, accompanied by very desirable increases in volume. However, thereafter increasing the concentration of the emulsifier discloses a deterioration in whipping ability together with lower volumes of the final product.

TABLE III

*The results in the whipping test of adding increasing amounts of emulsifier and a fixed amount of tetra sodium pyrophosphate using Swift's shasta fat*

| Fat (Swift's Shasta) additives in percent by weight of the mix | 1 min. whipping | 2 min. whipping | Volume (ml.) |
|---|---|---|---|
| Glyceryl monostearate, 0.02. Tetrasodpyrophosphate, 0.25. | Firm peaks. | -------- | 299 (poured very slowly). |
| Glyceryl monostearate, 0.04. Tetra sod. pyrophos., 0.25. | Fairly stiff peaks. | -------- | 299 (only just poured). |
| Glyceryl monostearate, 0.06. Tetrasod. pyrophos., 0.25. | Stiff peaks. | -------- | 271 (would not pour). |
| Glyc. monstearate, 0.08. Tetra sod. pyrophs., 0.25. | Firm to stiff peaks (not as stiff as preceding). | -------- | 287 (poured slowly). |

The startling decrease in the whipping time of the mix by the addition of .25% polyphosphate to varying amounts of emulsifier from .02 to .08% is clearly shown in this table. The desirable stiffness and maximum volume of the mix upon whipping occurred between a concentration of .04 and .06% of the emulsifier.

In Table IV, the emulsifier was retained with a concentration of .06%, which appeared to be the most desirable concentration from the results tabulated in Table III. The polyphosphate was utilized in varying concentrations from .025–.35%. As will be clearly noted from Table IV, concentrations of polyphosphate below .1% showed little improvement in the whipping qualities of the mix. However, above this percentage improvement in the whipping qualities as well as the volume of the mix is very marked, optimum results having been obtained at a concentration of .25% polyphosphate. However, the effects are still marked at a concentration of .35% polyphosphate. Volume increase begins at approximately .10% polyphosphate and remains relatively constant thereafter.

TABLE IV

*The results in the whipping test of adding a fixed amount of emulsifier and variable amounts of tetrasodium pyrophosphate*

| Fat (Swift's Shasta) additives in percent by weight of the mix | pH before homogn. | pH after aging | Viscosity at 44° F., secs. | 1 min. whipping | 2 min. whipping | Volume (ml.) |
|---|---|---|---|---|---|---|
| Glyc. monostearate, 0.06. Tetra sod. pyrophos., 0.025. | | | 18 | Thickened. | Piling up. | 299 (poured easily). |
| Glyc. monostearate, 0.06. Tetal sod. pyrophos., 0.05. | 6.4, 6.5, 6.5 | 6.1, 6.4, 6.3 | 17 | Thickened a little. | ----do---- | 265 (poured easily). |
| Glyc. monostearate, 0.06. Tetra sod. pyro., 0.10. | 6.4, 6.6, 6.6–6.7 | 6.0, 6.3, 6.3 | 18 | Thickened. | Very loose peaks. | 282 (poured a little slowly). |
| Glyc. monostearate, 0.06. Tetra sod. pyro., 0.15. | | | 18 | Piling up. | Loose to firm peaks. | 290 (poured rather slowly). |
| Glyc. monostearate 0.06. Tetra sod. pyrophos., 0.20. | 6.4, 6.5, 6.6 | 6.1, 6.4, 6.2–3 | 17 | Piling up heavily. | 1¾ min. stiff peaks. | 299 (only just poured). |
| Glyc. monostearate, 0.06. Tetra sod. pyro., 0.25. | | | 18 | Stiff peaks. | -------- | 299 (part would not pour). |
| Glyc. monostearate, 0.06. Tetra sod. pyro., 0.30. | 6.4, 7.0, 6.7 | 6.0, 6.4–5, 6.2–3 | 20 | Firm to stiff peaks. | -------- | 299 (poured very slowly). |
| Glyc. monostearate, 0.06. Tetra sod., pyro., 0.35. | | | 20 | ----do---- | -------- | 306 (poured very slowly). |

Note.—pH readings were made before homogenization and after 4 hours aging. 3 different kinds of test papers were used in each reading. Slight color changes were difficult to distinguish with the colored fluid. The last 2 samples became noticeably less white in color during pasteurization.

It is to be noted that very little change in viscosity takes place at the varying concentrations of polyphosphate, a definite slight increase being indicated, however, at concentrations from .3% polyphosphate and above. Although there is a fall in pH during pasteurization and aging of the mix, the extent of the fall is about equal throughout, regardless of the amount of polyphosphate present.

TABLE V

*The results in the whipping test of using different stabilizers with a fixed amount of emulsifier and reducing the amounts of the stabilizers and emulsifiers in the presence of a fixed amount of tetrasodium pyrophosphate*

| | Fat (Swift's Shasta) additives in percent by weight of the mix | 1 minute whipping | 2 minute whipping | Volume (ml.) |
|---|---|---|---|---|
| Sample I | Stabilizer C. M. C., 0.20<br>Emulsifier glyc. mono., 0.10 | Thickened a little | Piling up fairly heavily | 180. |
| Sample II | Stabilizer 255 bloom gelatin, 0.35<br>Emulsifier glyc. mono., 0.10 | Thickened | Piling up heavily | 239. |
| Sample III | Stabilizer C. M. C., 0.14<br>Emulsifier glyc. mono., 0.06<br>Tetra sod. pyrophos., 0.30 | Piling heavily | Firm to stiff peaks | 248. |
| Sample IV | Stabilizer 255 bloom gel., 0.23<br>Emulsifier glyc. mono., 0.06<br>Tetra sod. pyrophos., 0.30 | Just short of loose peaks | Stiff peaks | [1] 282. |

[1] Would not pour.
NOTE.—C. M. C. is sodium carboxymethyl cellulose. Glyc. mono. is glyceryl monostearate.

In Table V, Samples I and II include the stabilizer and the emulsifier in concentrations normally considered suitable for adequate stabilization in ice cream making. Although not seen from the whipping characteristics and volume obtained in the two minute whipping test of these samples, the mixing required became more effort along with the observable considerable reduction in whipping volume from the previous tables.

In Samples III and IV, wherein the amounts of both the stabilizer and the emulsifier were reduced from those amounts considered normally necessary and the polyphosphate added to the consequent mix, there was a marked improvement in whipping ability and a considerable increase in whipping volume.

In order to determine whether the higher volume products of Samples III and IV resulted in any deterioration of the final frozen confection product, the four samples were treated as shown in Table VI below.

the ability of the frozen confection to withstand heat shock is apparently improved by decreasing the amounts of stabilizer and emulsifier in the presence of a polyphosphate. Obviously, no change in the melt down characteristics occurred as among Samples I and II and Samples III and IV.

To determine the effect on churning of the addition of a polyphosphate to the frozen confection mix, the mix was made of the following composition:

40% Fat
5.50% Non-fat milk solids
54.5% Water

To one portion, nothing was added. To other portions, different emulsifiers were added, and to still other portions were added the same emulsifiers with tetra sodium pyrophosphate. The portions were pasteurized, homogenized, cooled, and whipped as in the whipping test. The time taken by each portion to "butter" was observed.

The portion of the mix with nothing added, "buttered" in 15 minutes.

The portion of the mix to which .06% glyceryl monostearate was added "buttered" in 10–11 minutes.

The portion of the mix to which .06% polyoxyethyl-

TABLE VI

*Results of freezing tests on the whipped product used for Table V*

| Sample | Texture after freezing | Body after freezing | Texture after heat shock | Melt down | Time for complete melting, mins. |
|---|---|---|---|---|---|
| I | Very slight roughness | Good | Very slight roughness | Creamy (no curds) | 10 |
| II | Smooth | do | do | do | 9½ |
| III | Very slight roughness indistinguishable from I | Good—No difference from I | Very slight roughness indistinguishable from I | do | 10 |
| IV | Smooth | Good—No difference from II | Smooth | do | 9½ |

The products were frozen in ¼ inch thick sections and stored at 5° F. for twenty-four hours, during which time they were heat shocked three times by exposure to a temperature of 42° F. for three minutes. The frozen sections were then allowed to melt at room temperature (85° F.) and the time taken for complete melting noted.

From the foregoing table, it is seen that the reduction in the amount of stabilizer and emulsifier in the presence of a suitable amount of polyphosphate does not result in any deterioration of texture or body of the frozen confection, nor does it impair the ability of the frozen confection to withstand heat shock. In fact, it is to be noted that in the utilization of gelatin as the stabilizer, ene sorbitan mono oleate was added "buttered" in one minute.

To a portion of the mix was added .06% glyceryl monostearate and .2% tetra sodium pyrophosphate. This sample buttered in 13½ minutes.

To yet another portion of the mix .06% polyoxyethylene sorbitan mono oleate and .2% tetra sodium pyrophosphate were added and this sample buttered in 6 minutes.

From the foregoing, it is to be noted that the time required to produce fat aggregation is considerably retarded, resulting in a better textured and fuller flavored product. The effect is very marked when the polyphosphate is utilized with a hydrophilic emulsifier such as polyoxyethylene sorbitan mono oleate and while the effect is not so marked when the polyphosphate is associated with glyceryl monostearate, the effect is nevertheless present.

The particular polyphosphate, emulsifier and stabilizer combinations set forth herein have been utilized with excellent results in the making of frozen confections, particularly ice cream and Mellorine.

Examples of frozen confections utilizing an alkali metal polyphosphate with the emulsifying and stabilizing agents therefore are set forth below.

EXAMPLE I

To make a 3000 lb. mix containing 12% vegetable fat, 16% sugar, 11% non-fat milk solids, 0.25% tetra-sodium pyrophosphate, 0.06% glyceryl monostearate, 0.25% 250 bloom gelatin, the following ingredients are combined:

360 lbs. fat
330 lbs. spray dried skim milk
120 lbs. corn sugar
360 lbs. cane sugar
7.5 lbs. tetra sodium pyrophosphate
1.8 lbs. glyceryl monostearate
7.5 lbs. 250 bloom gelatin
1813.2 lbs. water The water is run into the mixing vat and the temperature raised to 100° F. The gelatin is added in a convenient manner with agitation. The rest of the dry ingredients are added, the temperature being raised to 165° F. The fat is added last. The temperature is maintained at 165° F. for thirty minutes with agitation. The liquid is then pumped to the homogenizer for homogenization at 2500 lbs. pressure, after which it is cooled to 40° F., aged four hours and frozen. Before freezing, vanilla is added to taste and the mix suitably colored.

EXAMPLE II

To make a 1000 lb. mix containing 14.12% sugar, 12.5% butter fat, 0.15% sodium carboxymethyl cellulose, 0.2 sodium hexametaphosphate, 0.03% glyceryl monostearate using 30% cream and 3.5% milk, the following ingredients are combined:

141.2 lbs. sugar
497 lbs. 3.5% milk
358 lbs. 30% cream
1.5 lbs. sodium carboxymethyl cellulose
2.0 lbs. hexametaphosphate
.3 lbs. glyceryl monostearate The procedure is the same as in Example I except that some of the sugar is first mixed with the methyl cellulose to prevent lumping and the liquid ingredients are raised to a temperature of 120° F. in the mixing vat prior to the addition of the solid ingredients.

It is to be noted that less emulsifier is required in cream mixes since the cream itself contains some emulsifier, namely, a lecithin protein complex.

EXAMPLE III

To make a 1000 lb. mix containing 16.1% sugar, 6% vegetable fat, 13% non fat milk solids, 15% locust bean gum, .25% sodium tripolyphosphate, and .03% polyoxyethylene sorbitan tristearate, the following materials are combined:

130 lbs. spray dried skim milk
120 lbs. cane sugar
40 lbs. corn sugar
60 lbs. vegetable fat
1.5 lbs. locust bean gum
2.5 lbs. sodium tripolyphosphate
0.3 lbs. polyoxyethylene sorbitan tristearate
645.7 lbs. water The procedure is the same as that of Example I except that the locust bean gum is most conveniently added to the mix by first mixing the gum with seven times its weight of sugar and gradually adding the mixture to the liquid in the mixing vat at 120° F. with agitation.

What is claimed as new is as follows:

1. A method of improving the quality of confection mixes subjected to pasteurization and aging, which comprises the simultaneous addition to the mix at the beginning of the pasteurization period of 0.01% to 0.1% by weight of an emulsifying agent selected from the group consisting of the fatty acid esters of glycol, glycerol, sorbitol and sorbitan, and of 0.025% to 0.35% by weight of a polyphosphate, selected from the group consisting of sodium tripolyphosphate and tetra-sodium-pyrophosphate.

2. A frozen confection mix comprising milk solids, sugar, fat and .1–.3% by weight of the mix of an alkali metal polyphosphate selected from the group consisting of sodium tripolyphosphate and tetra-sodium-pyrophosphate, and .01–.1% per weight of an emulsifying agent selected from the group consisting of the fatty acid esters of glycol, glycerol, sorbitol and sorbitan.

References Cited in the file of this patent

UNITED STATES PATENTS

| | | |
|---|---|---|
| 2,065,398 | Roth et al. | Dec. 22, 1936 |
| 2,267,911 | Grettie et al. | Dec. 30, 1941 |
| 2,493,324 | Steiner et al. | Jan. 3, 1950 |
| 2,604,406 | Blihovde | July 22, 1952 |
| 2,665,211 | Roland | Jan. 5, 1954 |